US012627493B2

(12) United States Patent　　　　　　(10) Patent No.:　US 12,627,493 B2

Embrechts et al.　　　　　　　　　　(45) Date of Patent:　　May 12, 2026

(54) METHOD, CLOUD-SERVICE METHOD, CLOUD SERVER, SELF-SOVEREIGN IDENTITY METHOD FOR PROVIDING A SELF-SOVEREIGN IDENTITY CLOUD SERVICE TO A USER

(71) Applicant: Sony Group Corporation, Tokyo (JP)

(72) Inventors: Hugo Embrechts, Stuttgart (DE); Rik Claesen, Stuttgart (DE); Michele Minelli, Stuttgart (DE); Noriyuki Suzuki, Stuttgart (DE); Kenji Suzuki, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 139 days.

(21) Appl. No.: 18/580,638

(22) PCT Filed: Jul. 29, 2022

(86) PCT No.: PCT/EP2022/071314

§ 371 (c)(1),
(2) Date: Jan. 19, 2024

(87) PCT Pub. No.: WO2023/006937

PCT Pub. Date: Feb. 2, 2023

(65)　　　　　Prior Publication Data

US 2025/0080346 A1　　　Mar. 6, 2025

(30)　　　Foreign Application Priority Data

Jul. 29, 2021　(EP) ..................................... 21188462

(51) Int. Cl.
*H04L 9/14*　　　　(2006.01)

(52) U.S. Cl.
CPC ..................................... *H04L 9/14* (2013.01)

(58) Field of Classification Search
CPC ......................................................... H04L 9/14
See application file for complete search history.

(56)　　　　　　References Cited

U.S. PATENT DOCUMENTS

| | | | |
|---|---|---|---|
| 10,872,145 B2 | 12/2020 | Brown et al. | |
| 2016/0373257 A1* | 12/2016 | Adrangi | .................. H04L 9/006 |

(Continued)

FOREIGN PATENT DOCUMENTS

| | | |
|---|---|---|
| WO | 2021/004636 A1 | 1/2021 |

OTHER PUBLICATIONS

International Search Report and Written Opinion mailed on Nov. 9, 2022, received for PCT Application PCT/EP2022/071314, filed on Jul. 29, 2022, 13 pages.

(Continued)

*Primary Examiner* — Yonas A Bayou

(74) *Attorney, Agent, or Firm* — XSENSUS LLP

(57)　　　　　　　ABSTRACT

The present disclosure relates to a method for providing a self-sovereign identity cloud service to a user. The method includes signing, on a user device of the user, an instruction to store self-sovereign identity data of the user based on a user private key of a user asymmetric key pair. The method further includes sending the signed instruction and the self-sovereign identity data from the user device to a cloud server. The method further includes verifying, in a trusted execution environment of the cloud server, the signed instruction based on a user public key of the user asymmetric key pair. The method further includes, if the signed instruction is approved, storing the self-sovereign identity data in the trusted execution environment.

15 Claims, 10 Drawing Sheets

(56) References Cited

U.S. PATENT DOCUMENTS

| | | | | |
|---|---|---|---|---|
| 2019/0081792 A1* | 3/2019 | Thom | .................. | H04L 9/3263 |
| 2019/0379540 A1* | 12/2019 | Liderman | .............. | G06F 21/44 |
| 2020/0280547 A1* | 9/2020 | Rawalkshatriya | .... | H04L 9/0891 |
| 2020/0396065 A1* | 12/2020 | Gutierrez-Sheris | ......................... | |
| | | | | H04L 67/1095 |
| 2022/0129544 A1* | 4/2022 | Touitou | .................. | G06F 21/53 |

OTHER PUBLICATIONS

"Building SSI Digital Wallets: The 3 Major Decisions", Trinsic, Available Online at: https://trinsic.id/ssi-wallets-3-decisions/, Retrieved from the net on: Mar. 25, 2021, pp. 1-10.
Dan Gisolfi, "Self-sovereign identity: Unraveling the terminology", Blockchain Pulse: IBM Blockchain Blog, Available Online at: https://www.ibm.com/blogs/blockchain/2018/06/self-sovereign-identity-unraveling-the-terminology/, Jun. 22, 2018, pp. 1-11.

* cited by examiner

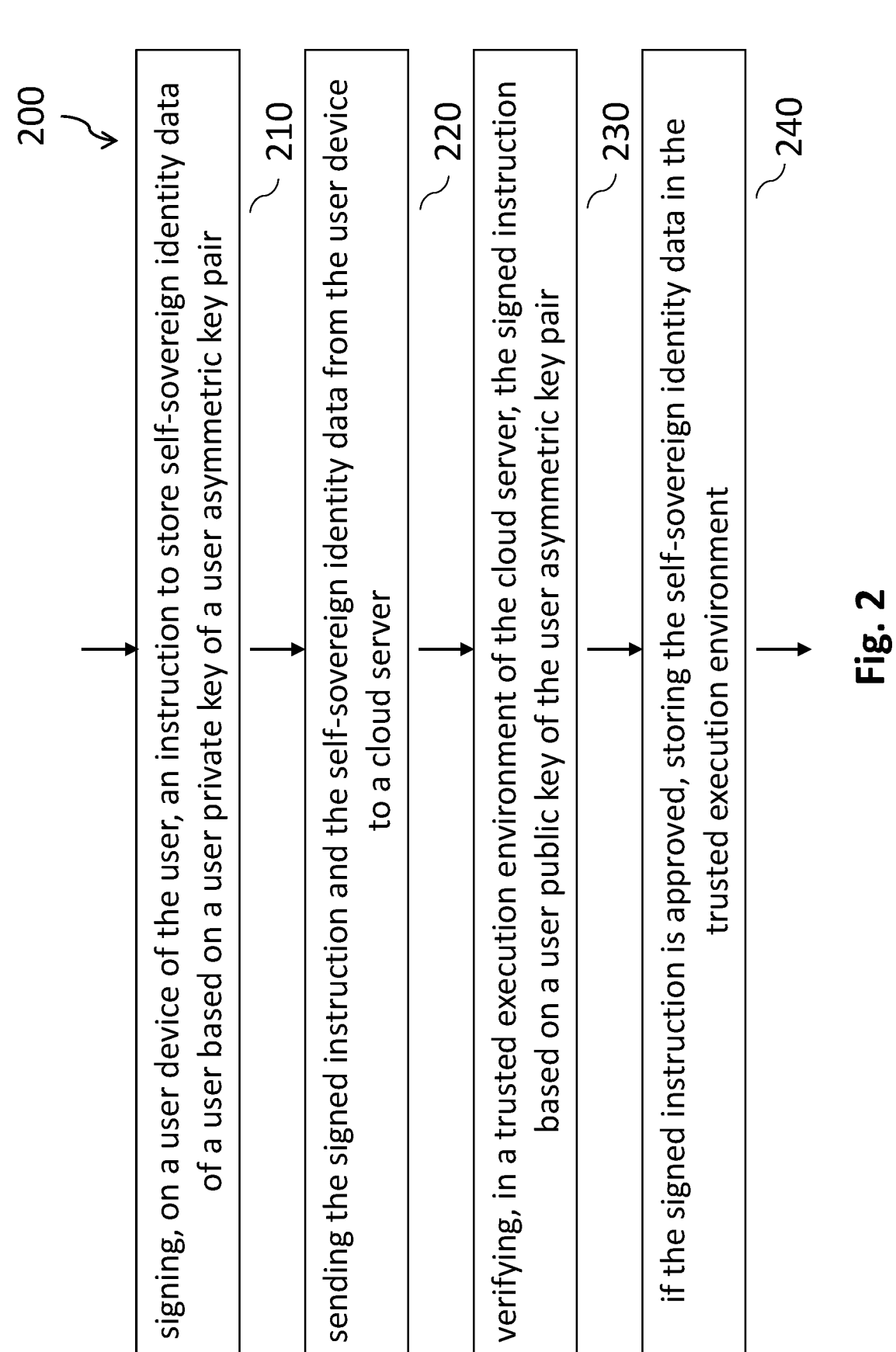

signing, on a user device of the user, an instruction to store self-sovereign identity data of a user based on a user private key of a user asymmetric key pair

210 sending the signed instruction and the self-sovereign identity data from the user device to a cloud server

220 verifying, in a trusted execution environment of the cloud server, the signed instruction based on a user public key of the user asymmetric key pair

230 if the signed instruction is approved, storing the self-sovereign identity data in the trusted execution environment

400 registering a user device on a trusted execution environment

410

200 synchronizing, on the user device, self-sovereign identity data stored on the user device with the self-sovereign identity data stored on the trusted execution environment.

420

700

200

710 sending, upon a request from the user device, the self-sovereign identity data or portions thereof from the cloud server to a third party

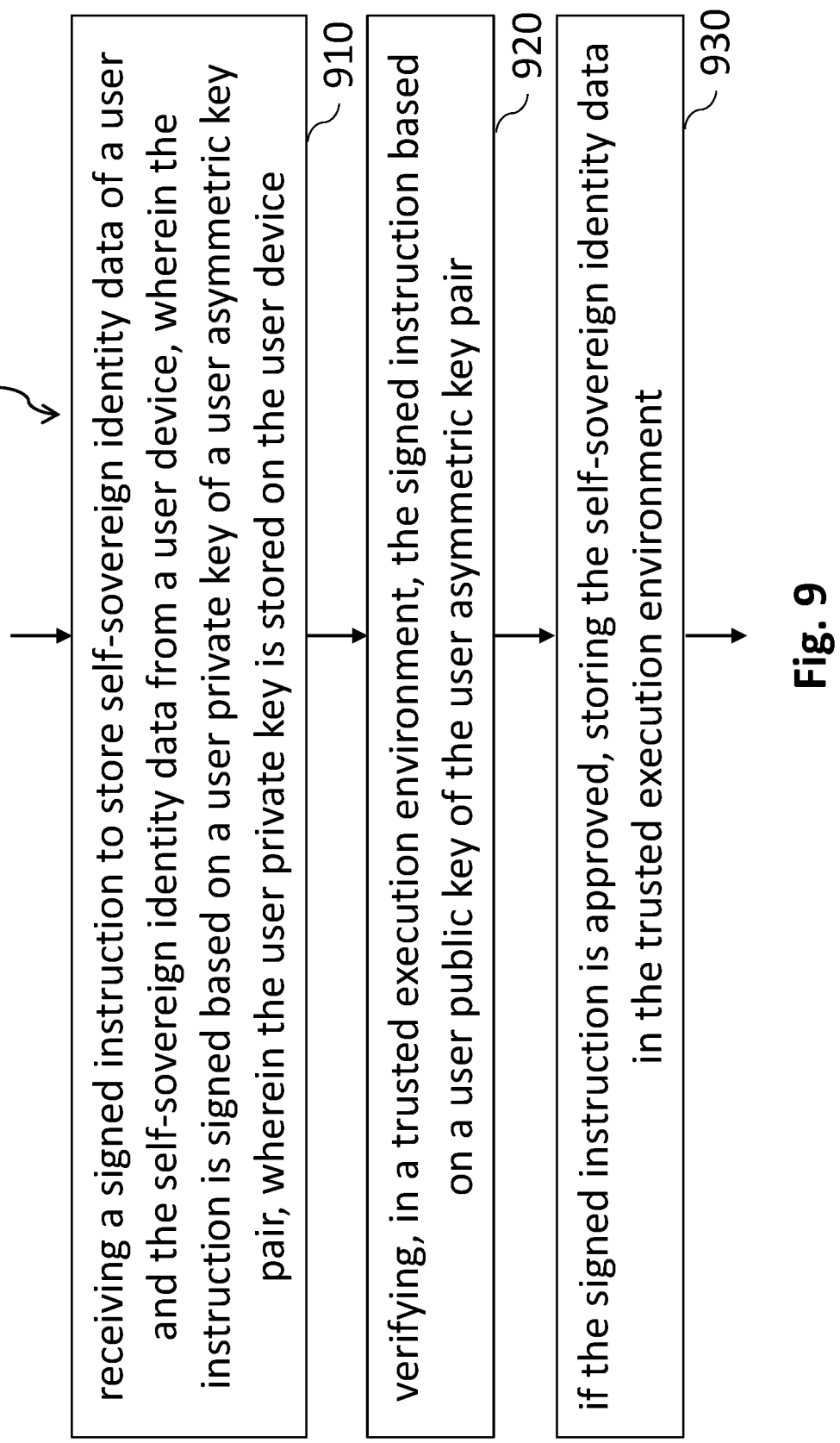

900 receiving a signed instruction to store self-sovereign identity data of a user and the self-sovereign identity data from a user device, wherein the instruction is signed based on a user private key of a user asymmetric key pair, wherein the user private key is stored on the user device

910 verifying, in a trusted execution environment, the signed instruction based on a user public key of the user asymmetric key pair

920 if the signed instruction is approved, storing the self-sovereign identity data in the trusted execution environment

METHOD, CLOUD-SERVICE METHOD, CLOUD SERVER, SELF-SOVEREIGN IDENTITY METHOD FOR PROVIDING A SELF-SOVEREIGN IDENTITY CLOUD SERVICE TO A USER

CROSS-REFERENCE TO RELATED APPLICATIONS

The present application is based on PCT filing PCT/EP2022/071314, filed Jul. 29, 2022, which claims priority from European Patent Application No. 21188462.2, filed Jul. 29, 2021, the entire contents of each are incorporated herein by reference.

FIELD

Examples relate to a method, a cloud-service method, a cloud server, and a self-sovereign identity method for providing a self-sovereign identity cloud service to a user.

BACKGROUND

Self-Sovereign Identity (SSI) enables a user of the Web to control his/her digital identity without an intervention of a centralized identity management system. A so-called digital wallet is used to store self-sovereign identity data, often comprising confidential material like decentralized identifiers and corresponding secret keys or SSI credentials.

The digital wallet usually is part of an electronic device possessed by the user, e.g., a smartphone. This may cause several problems concerning a management of the digital wallet. Firstly, in case the electronic device is broken or lost, the digital wallet may be lost as well. A second digital wallet may therefore be created on a second electronic device possessed by the user. In this case, the user needs to take care of exporting/importing and synchronizing the digital wallet. Secondly, if the electronic device is stolen, the user may lose control over the digital wallet. The digital wallet may even be misused to impersonate the user.

Hence, there may be a demand for improved digital identity management.

SUMMARY

The demand may be satisfied by the subject matter of the appended claims.

An example relates to a method for providing a self-sovereign identity cloud service to a user. The method comprises signing, on a user device of the user, an instruction to store self-sovereign identity data of the user based on a user private key of a user asymmetric key pair. The method further comprises sending the signed instruction and the self-sovereign identity data from the user device to a cloud server. The method further comprises verifying, in a trusted execution environment of the cloud server, the signed instruction based on a user public key of the user asymmetric key pair. The method further comprises, if the signed instruction is approved, storing the self-sovereign identity data in the trusted execution environment.

Another example relates to a cloud server for providing a self-sovereign identity cloud service to a user. The cloud server comprises an interface configured to receive a signed instruction to store self-sovereign identity data of the user and the self-sovereign identity data from a user device. The instruction is signed based on a user private key of a user asymmetric key pair. The user private key is stored on the user device. The cloud server further comprises a trusted execution environment configured to verify the signed instruction based on a user public key of the user asymmetric key pair. The trusted execution environment is further configured to store the self-sovereign identity data if the signed instruction is approved.

Another example relates to a cloud service method for providing a self-sovereign identity cloud service to a user. The cloud service method comprises receiving a signed instruction to store self-sovereign identity data of the user and the self-sovereign identity data from the user device. The instruction is signed based on a user private key of a user asymmetric key pair. The user private key is stored on the user device. The cloud service method further comprises verifying, in a trusted execution environment, the signed instruction based on a user public key of the user asymmetric key pair. The cloud service method further comprises storing the self-sovereign identity data in the trusted execution environment if the signed instruction is approved.

Another example relates to a self-sovereign identity method comprising signing an instruction to store self-sovereign identity data of a user based on a user private key of a user asymmetric key pair. The self-sovereign identity method further comprises sending the signed instruction and the self-sovereign identity data to a trusted execution environment of a cloud server. The trusted execution environment has access to a user public key of the user asymmetric key pair.

BRIEF DESCRIPTION OF THE FIGURES

Some examples of apparatuses and/or methods will be described in the following by way of example only, and with reference to the accompanying figures, in which

FIG. 2 illustrates a flowchart of an example of a method for providing a self-sovereign identity cloud service to a user;

FIG. 9 illustrates a flow chart of an example of a cloud service method for providing the self-sovereign identity cloud service to the user.

DETAILED DESCRIPTION

Figure 1:
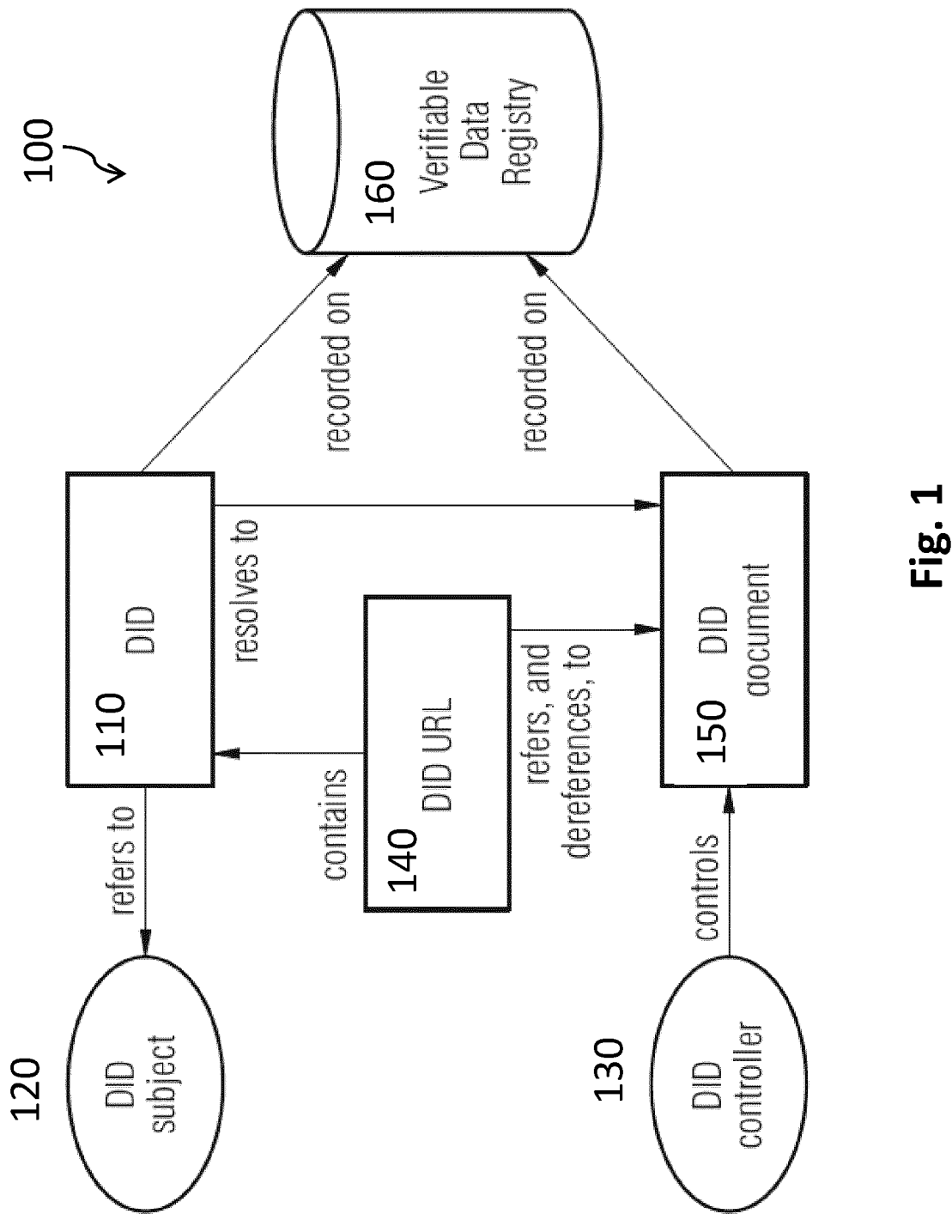
FIG. 1 illustrates a conventional architecture of Decentralized Identifiers.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Embodiments of the present disclosure are related to a digital wallet in the context of Self-Sovereign Identity, SSI. The digital wallet may include, e.g., an electronic device, a data storage, an online service, and/or a software program configured to manage an SSI of a user. The digital wallet may generate, store, and manage Decentralized Identifiers, DIDs, that are used similarly to digital identifiers for conventional digital identities. In contrast to the conventional digital identity, SSI allows the user to control his/her digital identity. Therefore, the digital wallet is solely accessible by the user, or entities or mechanisms that are authorized by the user.

FIG. 1 illustrates a conventional architecture 100 for DIDs. A DID 110 refers to any entity, DID subject 120, that a controller of the DID 110, DID controller 130, decides that it refers to. In the context of the present disclosure, the above-mentioned user may act as the DID controller 130. It is to be noted, that in most cases the DID subject 120 and the DID controller 130 refer to the same entity, e.g., the user.

The DID 110 may be considered a digital identifier which is independent from any centralized registry, identity provider, or certificate authority. The DID 110 may be a simple text string comprising three parts: 1) a DID URL 140 (Uniform Resource Locators), 2) an identifier for a DID method, and 3) a DID method-specific identifier. DID methods may be a mechanism by which a particular type of DID 110 and an associated DID document 150 are created, resolved, updated, and deactivated according to a DID method specification.

The DID 110 uses DID URLs 140 to associate the DID 110 with the DID document 150, extending the syntax of the DID 110 to incorporate standard URL components such as path, query, and fragment in order to locate a particular resource, for example, a cryptographic public key inside the DID document 150, or a resource external to the DID document 150.

In the same manner URLs in the web resolve to an IP-address (Internet Protocol), the DID URL 140 resolves to the DID document 150. DIDs 110 may allow trustable interactions associated with the DID subject 120 as the DID 110 as well as the DID document 150 may be recorded on a verifiable data registry 160. Non-limiting examples for a verifiable data registry 160 are distributed ledgers, decentralized file systems, decentralized databases of any kind, peer-to-peer networks, blockchains, and other forms of trusted data storage.

If the DID subject 120 is a private individual, the DID 110 and DID document 150 may usually be recorded on a local data storage of a user device rather than on a public data registry. The user device may be any electronic device possessed by the user. The DID controller 130 may have as many DIDs 110 as to maintain a desired separation of digital identities, digital personas, and interactions. The use of the DIDs 110 can be scoped appropriately to different contexts. The DIDs 110 may support interactions with other entities via computer systems, when the interactions require a digital identification, and provide control over how much personal data of the user should be revealed.

The DID document 150 expresses a set of data, e.g., self-sovereign identity data. The self-sovereign identity data may include attributes describing the DID subject 120, cryptographic material, verification methods, all sorts of secrets including RSA keys or elliptic curve keys, or service endpoints and may provide a set of mechanisms enabling a DID controller 130 to prove control of the DID 110 to another entity. The cryptographic material is, e.g., used to prove certain aspects or attributes of the SSI of the DID subject 120 by using a digital signature.

It is to be noted, that the SSI architecture shown in FIG. 1 is intended as an example. In other SSI architectures, the DID 110 may be stored on a local data registry of the DID subject 120, or the DID URL may be replaced by a different method for locating a resource in a computer network.

Since in the conventional SSI architecture the self-sovereign identity data is stored on the user device, the above-mentioned problems may arise concerning digital identity management. An objective of the present disclosure may be providing a digital wallet as a cloud service to the user without any restriction in information security.

FIG. 2 illustrates a flowchart of a method 200 for providing a self-sovereign identity cloud service to a user. The method 200 comprises signing 210, on a user device of the user, an instruction to store self-sovereign identity data of the user based on a user private key of a user asymmetric key pair. The method 200 further comprises sending 220 the signed instruction and the self-sovereign identity data from the user device to a cloud server. The method 200 further comprises verifying 230, in a trusted execution environment (TEE) of the cloud server, the signed instruction based on a user public key of the user asymmetric key pair. The method 200 further comprises, if the signed instruction is approved, storing 240 the self-sovereign identity data in the TEE.

Figure 3:
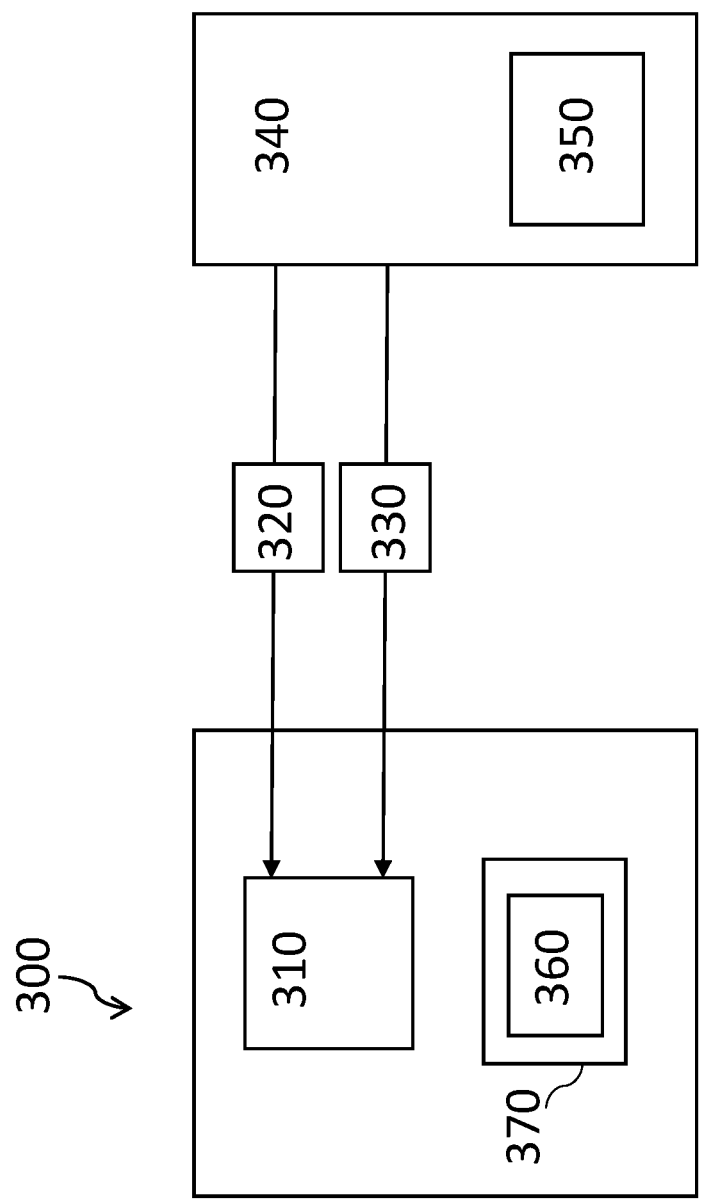
FIG. 3 illustrates an example of a cloud server for providing the self-sovereign identity cloud service to the user.

The method 200 will be explained in the following with reference to FIG. 3 which illustrates a cloud server 300 for providing a self-sovereign identity cloud service to a user.

The cloud server 300 comprises an interface 310 configured to receive a signed instruction 320 to store self-sovereign identity data 330 of the user and the self-sovereign identity data 330 from a user device 340. The instruction 320 is signed based on a user private key 350 of a user asymmetric key pair. The user private key 350 is stored on the user device 340.

The cloud server 300 may be considered a computer system, e.g., a data center, which provides computer system resources, in particular data storage and computing power, as a service to clients, such as the user, without direct active management by the clients. In other words, the cloud server 300 may usually not be in the possession or control of the user. The computer system resources may be accessible for the user via a computer network. The computer network may provide infrastructure to exchange data between multiple computer systems. Such infrastructure may comprise servers, network cables, fibre optic cables, routers, etc. The computer network may include any electronic communication means which incorporates both hardware and software of such communication among parties. Communication may be accomplished through any suitable communication channels, such as a telephone network, an extranet, an intranet, Internet, point of interaction device, online communications, offline communications, wireless communications, transponder communications, Local Area Network, Wide Area Network, networked or linked devices, or alike. The data may be exchanged in accordance with communication protocols, such as TCP/IP, AppleTalk, IP-6, NetBIOS, OSI or any number of existing or future protocols.

As used herein, the term "user" may be understood as any entity that could benefit from a service provided by a cloud server. For example, user may be one or more human beings. The user may alternatively be a machine, a software, a device, a subpart of a machine, system or electronic device, or a collection or combination of the previously mentioned. For instance, an electronic device could be a printed circuit board and could integrate an executable software component, e.g., an artificial intelligence. Thus, the user may be any reasonable entity, human or non-human, that is capable of making use of the service provided by the cloud server.

The user device 340 may be a computer system possessed and/or controlled by the user. The user device 340 may have at least partial access to a computer network with at least partial connection to the cloud server 300. As used herein, the term "computer system" may include multiple constituent computer systems. Computer systems may, for example, be handheld devices, appliances, laptop computers, desktop computers, mainframes, distributed computer systems, data-centers, or wearables.

The interface 310 may be understood as a hardware and/or software component across which two or more separate computer systems, such as the cloud server 300 and the user device 340, or components of a computer system may exchange data. The data may be exchanged via a computer network connecting the interface 310 of the cloud server 300 with the user device 340.

The signed instruction 320 may be thought of as data generated by the user device 340, e.g., automatically and/or based on a request of the user. The signed instruction 320 may be digitally signed following cryptographical principles of digital signatures. Digital signatures give a proof of authenticity, data integrity and non-repudiation of communications conducted over a computer network. Digital signatures are generated and verified, e.g., through standardized frameworks such as the Digital Signature Algorithm (DSA). Digital signing is typically based on three algorithms: 1) Key generation: This algorithm provides a private key, such as the user private key 350, along with its corresponding public key, such as a user public key 360 that, together with the user private key 350, forms the user asymmetric key pair.

2) Signing, such as the signing 210 of method 200: This algorithm produces the digital signature based on the private key and the data that is being signed, e.g., the instruction 320 to store the self-sovereign identity data 330. 3) Verifying, such as verifying 230 of method 200: This algorithm checks for the authenticity of the data that is being signed by applying the public key.

An exemplary realization of digital signing in the example of method 200 may be described as follows: Signing 210 may optionally comprise generating, on the user device 340, a hash of the instruction 320 and encrypting the hash based on the user private key 350. Verifying 230 may optionally comprise decrypting, on the cloud server 300, the encrypted hash based on the user public key 360 and checking if the decrypted hash matches a hash of the instruction 320. If they match, the signed instruction 320 may be considered as approved.

According to asymmetric key encryption, the private key is the only cryptographic algorithm capable of encrypting the data in a way that the data can be decrypted based on the corresponding public key. In this manner, as the user private key 350 may solely be accessible by the user device 340, the user device 340 may prove its authenticity and the data integrity of the instruction 320 and/or the data integrity of the self-sovereign identity data 330.

The self-sovereign identity data 330 may be thought of any data relevant for a SSI of the user which may, e.g., be stored in a DID document, such as DID document 150. The self-sovereign identity data 330 may comprise DIDs, such as DID 110, verified credentials (verified by a trusted entity), self-attested information (attested by the user), for instance.

Referring back to FIG. 3, the cloud server 300 further comprises a TEE 370 configured to verify the signed instruction 320 based on the user public key 360 of the user asymmetric key pair and, if the signed instruction 320 is approved, store the self-sovereign identity data 330.

The TEE 370 may be thought of a secure area or secure enclave integrated in an untrusted environment of a computer system. The TEE 370 may protect code and data loaded inside TEE 370 with respect to confidentiality and integrity. The TEE 370 may therefore be inaccessible from inspection and modification by an execution of untrusted code in the untrusted environment. The TEE 370 may establish an isolated execution environment that runs in parallel with an operating system of the untrusted environment. The TEE 370 may defend sensitive code and data, such as the self-sovereign identity data 330, against software attacks from the potentially compromised operating system. Common examples of TEE technologies are ARM Trust-Zone and Intel SGX which use hybrid hardware and software mechanisms to protect the sensitive code and data. The TEE 370 may not be accessible by privileged processes like an operating system or the Hypervisor of the cloud server 300. The TEE 370 may guarantee security of sensitive information, i.e., content of the TEE 370 proves that it is not available for unauthorized processes, authenticity, i.e., the TEE 370 proves that it is the intended recipient of data sent by the user, and reliability, i.e., the TEE 370 proves that code of the TEE 370 is not tampered with and executed as intended by the user.

One example of how to realize the isolation of the TEE 370 is to use a so-called hardware root of trust. The hardware root of trust relates to a set of private keys that are embedded into a semiconductor chip during manufacturing. Usually, the keys are unique for each hardware component of the TEE 370, such that a key extracted from one hardware component cannot be used to compromise other hardware components of the TEE 370, for example, using physically unclonable functions. The private keys cannot be changed, even after software resets. Corresponding public keys reside in a manufacturer database, together with a hash of a public key belonging to a trusted party. The latter-mentioned public key is used to sign trusted firmware of the TEE 370 and control access to the TEE 370. The public key of the manufacturer is hashed; this hash is then compared to the one embedded in the TEE 370. If the hashes match, the public key is used to verify a digital signature of the trusted firmware. The trusted firmware may be used to implement remote attestation.

It is to be noted, that the description of the TEE 370 given above is meant as an example. The TEE 370 may use any other technology to establish an execution environment for code and data which is protected against modifications or inspections that are unintended or unauthorized by the user.

Figure 4:
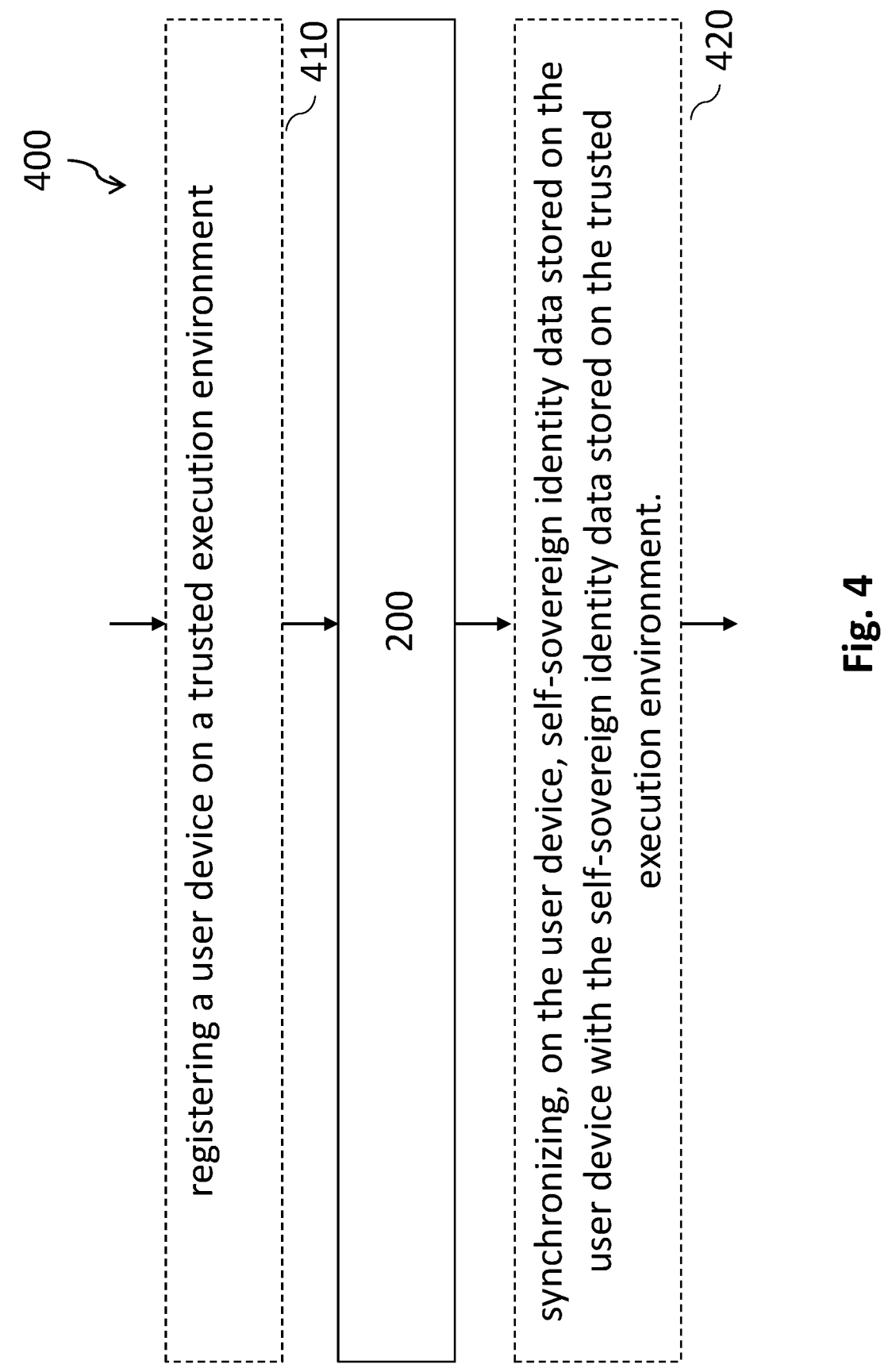
FIG. 4 illustrates a flowchart of another example of the method for providing the self-sovereign identity cloud service to the user.

To ensure that the untrusted execution environment of the cloud server 300 has no access to the self-sovereign identity data 330 stored in the TEE 370, the self-sovereign identity data 330 may be encrypted based on a cloud asymmetric key pair, for instance. A cloud private key may be controlled solely by the TEE 370. A corresponding cloud public key of the cloud asymmetric key pair may be communicated from the cloud server 300 to the user device 340 during registration of the user device 340, for instance. This option is shown in FIG. 4 which illustrates a flowchart of a method 400 which may be considered an optional enhancement of method 200.

Figure 5:
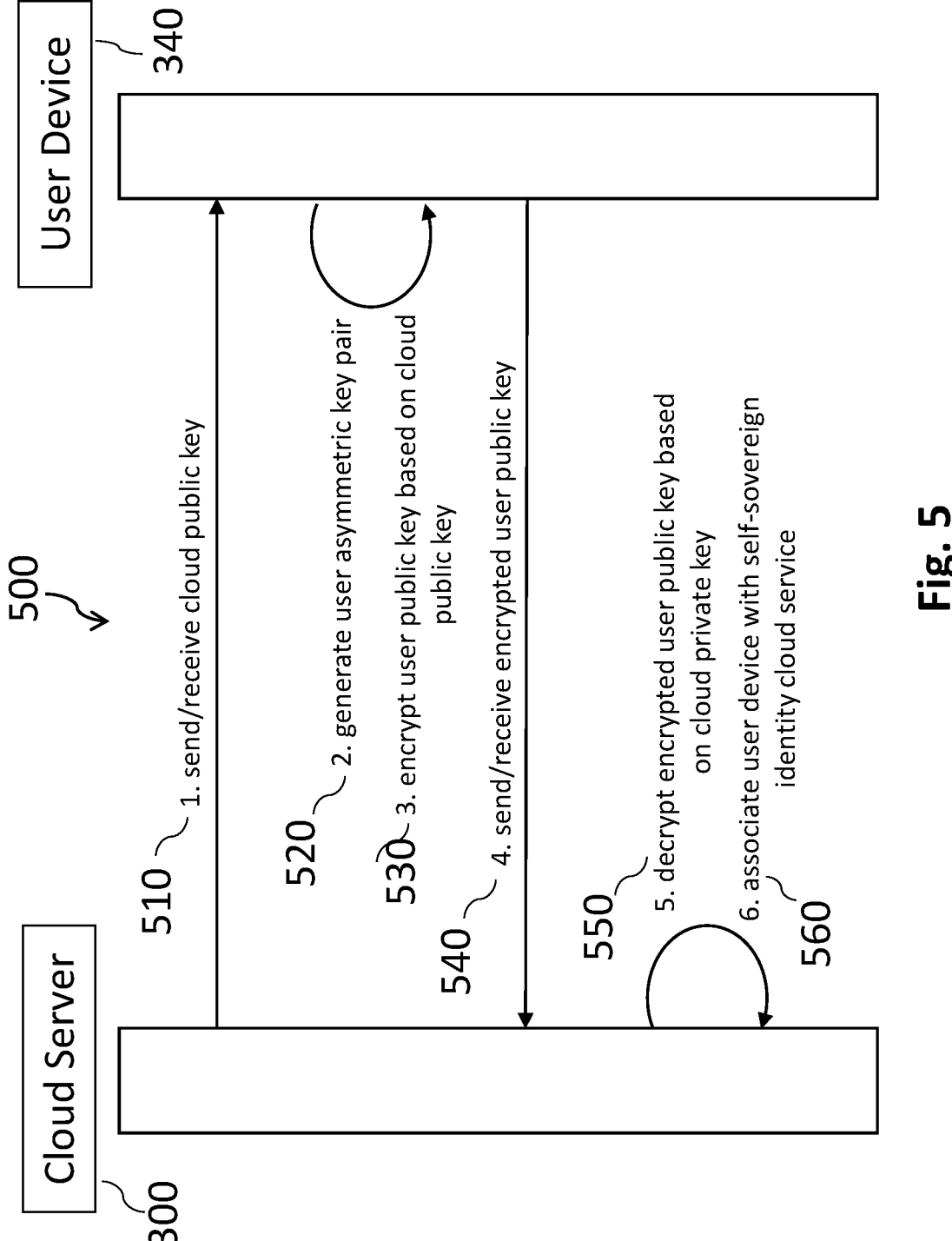
FIG. 5 illustrates a signal flow chart of an exemplary registration process of a user device.

The method 400 comprises registering 410 a user device, such as user device 340, on a TEE, such as TEE 370. Registering 410 is further described with reference to FIG. 5 which illustrates a signal flow chart of a registration process 500 of a user device.

As a first step 510 of the registration process 500, the user device, such as user device 340, receives a cloud public key of a cloud asymmetric key pair from a cloud server, such as cloud server 300. As a second step 520, the user device 340 generates a user asymmetric key pair. As a third step 530, the user device 340 encrypts a user public key 360 of the user asymmetric key pair based on the cloud public key. As a fourth step 540, the user device 340 sends the encrypted user public key 360 to the cloud server 300. Alternatively to the third and fourth step, the user device 340 may send the user public key 360 in clear, without encryption. As a fifth step 550, the cloud server 300 decrypts the encrypted user public key 360 based on a cloud private key of the cloud asymmetric key pair. Step 550 may preferably be operated in a TEE (370) of the cloud server 300. As a sixth step 560, the cloud server 300 associates the user device 340 with a self-sovereign identity cloud service, preferably by storing the user public key 360 in the TEE (370). In other words, the cloud server 300 may assign a token labelling the user device 340 to a token labelling the self-sovereign identity cloud service and may store the assignment on a data storage. The self-sovereign identity cloud service may be thought of a digital wallet for an SSI of a user controlling the user device 340.

In this manner, a secure communication channel may be established between the TEE 370 and the user device 340. Communications with untrusted parts of the cloud server 300 may be secured based on HTTPS (Hypertext Transfer Protocol Secure), for instance. The user device 340 may use the cloud public key after the registration process 500 to encrypt data, such as the self-sovereign identity data 330, to be transmitted to the cloud server 300. The secure communication channel may avoid an unauthorized access to the self-sovereign identity data 330 by any untrusted party and by the untrusted execution environment of the cloud server 300.

The registration process 500 may also be part of an initialization of a TEE, such as TEE 370. In other words, when a user requests a registration of his/her user device 340, a portion of the TEE 370 may be isolated from the rest of the TEE 370 and data stored on the TEE 370 may be only accessible by the user device 340.

Referring back to FIG. 4, the method 400 may further comprise the steps of method 200 and the method 400 may further comprise synchronizing 420, on the user device 340, self-sovereign identity data stored on the user device 340 with the self-sovereign identity data 330 stored on the TEE 370.

Synchronizing 420 may relate to data synchronization, a process which establishes data consistency among data, such as self-sovereign identity data 330, from a source, such as the cloud server 300, to a target data storage, such as the user device 340, and vice versa and establishes continuous harmonization of the data over time. Synchronizing 420 between the user device 340 and the cloud server 300 may be advantageous compared to a conventional (locally managed) digital wallet as the user does not have to handle the data synchronization between multiple devices.

In other examples of the present disclosure the method 400 may further comprise receiving, at the user device 340 a remote attestation for the cloud public key from an attestation server. The remote attestation may, as described above, allow unauthorized changes in the TEE 370 to be detected by authorized parties, such as the manufacturer of hardware of the TEE 370. This may be part of registering 410 the user device 340. The remote attestation may, for instance, enable a verification of the TEE 370 by the authorized parties before the user discloses any private information, such as SSI credentials. In the case of Intel SGX, Intel provides an attestation service, i.e., a web service that checks digital signatures produced by the TEE 370 and verifies that the digital signatures originate from a genuine SGX enclave. A verification report is signed with Intel's private key, and anyone can verify it with a corresponding public key.

Figure 6:
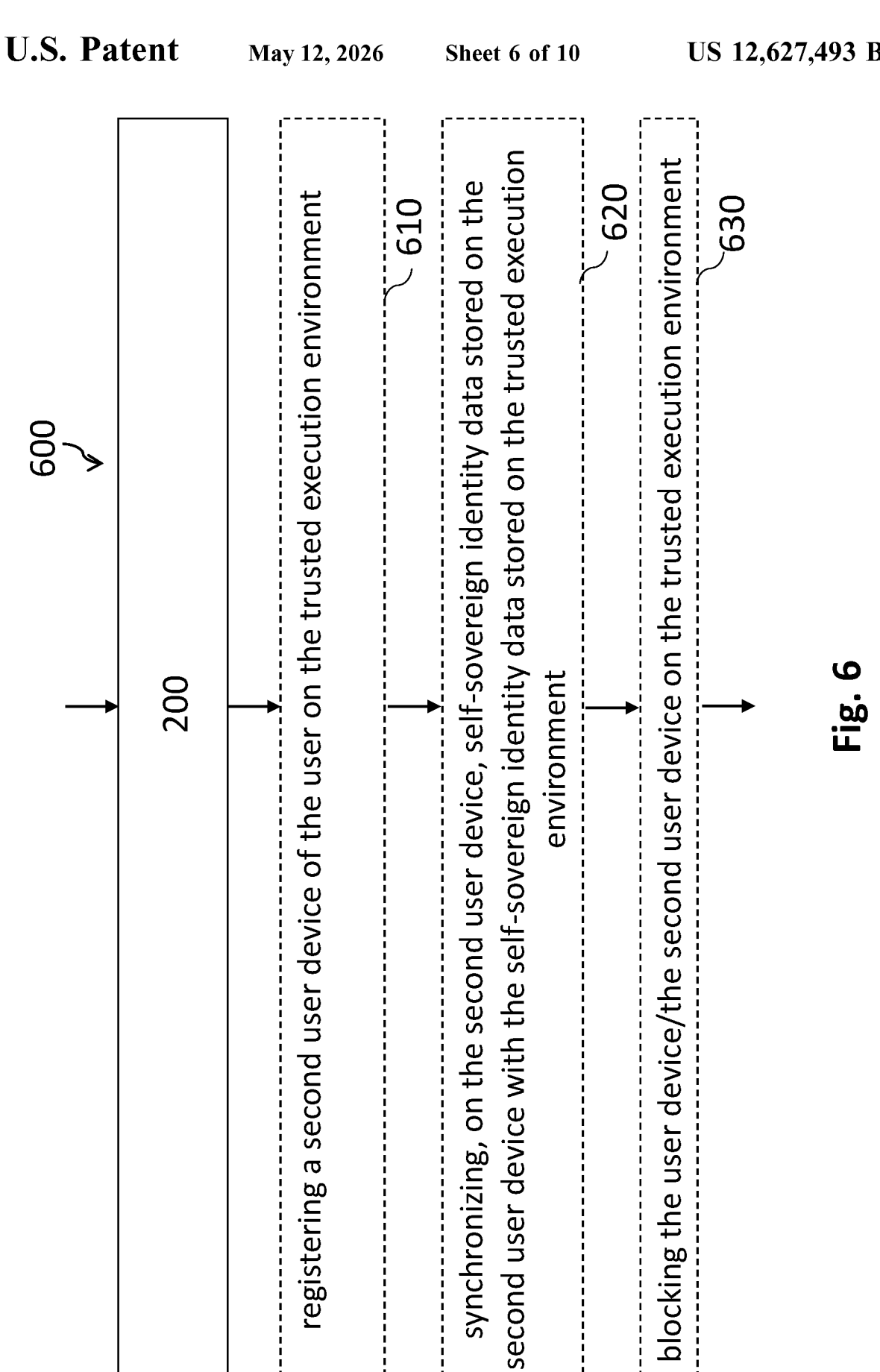
FIG. 6 illustrates a flow chart of another example of the method for providing the self-sovereign identity cloud service to the user.

FIG. 6 illustrates a flow chart of a method 600 which may comprise optional steps enhancing method 200. The method 600 comprises the steps of method 200. Optionally, the method 600 comprises registering 610 a second user device of the user on a TEE, such as TEE 370. An example of the registering 610 of the second user device may be explained below with reference to FIG. 8.

The second user device may be a further electronic device controlled by the user. For instance, the user device, such as user device 340, may be a smartphone of the user and the second user device may be a laptop of the user. Registering 610 the second user device may be advantageous since an access to the TEE 370 may then not solely depend on the operability of the user device 340. In particular, when the user device 340 is lost, stolen, or broken, the user may not lose access to the self-sovereign identity data, such as self-sovereign identity data 330.

For registering 610 the second user device, the second user device may generate a second user asymmetric key pair, store a second user private key of the second user asymmetric key pair on the second user device and send (e.g., via a computer network) a second user public key of the second user asymmetric key pair to the user device 340. Further steps may be similar to registering 410 the user device 340. For instance, registering 610 may comprise encrypting, on the user device 340, the second user public key based on the cloud public key. Registering 610 the second user device may further comprise sending the encrypted second user public key from the user device 340 to the cloud server, such as cloud server 300. Registering 610 the second user device may further comprise decrypting, in the TEE, such as TEE 370, the encrypted second public key based on the cloud private key. Registering 610 the second user device may further comprise associating the second user device with the self-sovereign identity cloud service by storing the second user public key on the TEE 370.

Referring back to FIG. 6, the method 600 optionally comprises synchronizing 620, on the second user device, self-sovereign identity data stored on the second user device with the self-sovereign identity data, such as the self-sovereign identity data 330, stored on the TEE 370. Similarly, to step 420 of FIG. 4, synchronizing 620 may relate to data synchronization of multiple computer systems. Synchronizing 620 as a service of the TEE 370 may be advantageous since the user may not have to handle a synchronization of multiple electronic devices.

The method 600 optionally comprises blocking 630 (de-authorizing, deregistering) the user device 340 or the second user device on the TEE 370. Blocking 630 the user device 340 may, e.g., comprise receiving, at the second user device, a tag of the user public key 360 from the TEE 370. The tag may indicate an identifier linked to the user public key 360. As the access to the TEE 370 may be granted by a digital signature based on the user asymmetric key pair, as described above, the second user public key may be required for accessing the TEE 370.

The user may, for instance, download on the second user device a look-up table from the TEE 370 showing all registered user devices and select on a graphical user interface the (tags, names of) user devices to be blocked. This selection may be considered a blocking request. Blocking 630 the user device 340 may comprise sending the blocking request indicating the tag of the user public key 360 from the second user device to the cloud server, such as cloud server 300. Blocking 630 the user device 340 may further comprise deleting the user public key 360 in the TEE 370. In this manner, the user device 340 may not be able to access the TEE 370 anymore. This may be advantageous for the case the user device 340 is stolen or lost. Then, it may not be possible to misuse the user device 340 for stealing private data of the user, such as the self-sovereign identity data 330, or for impersonating the user.

Similarly, the second user device may be blocked via the user device 340.

Figure 7:
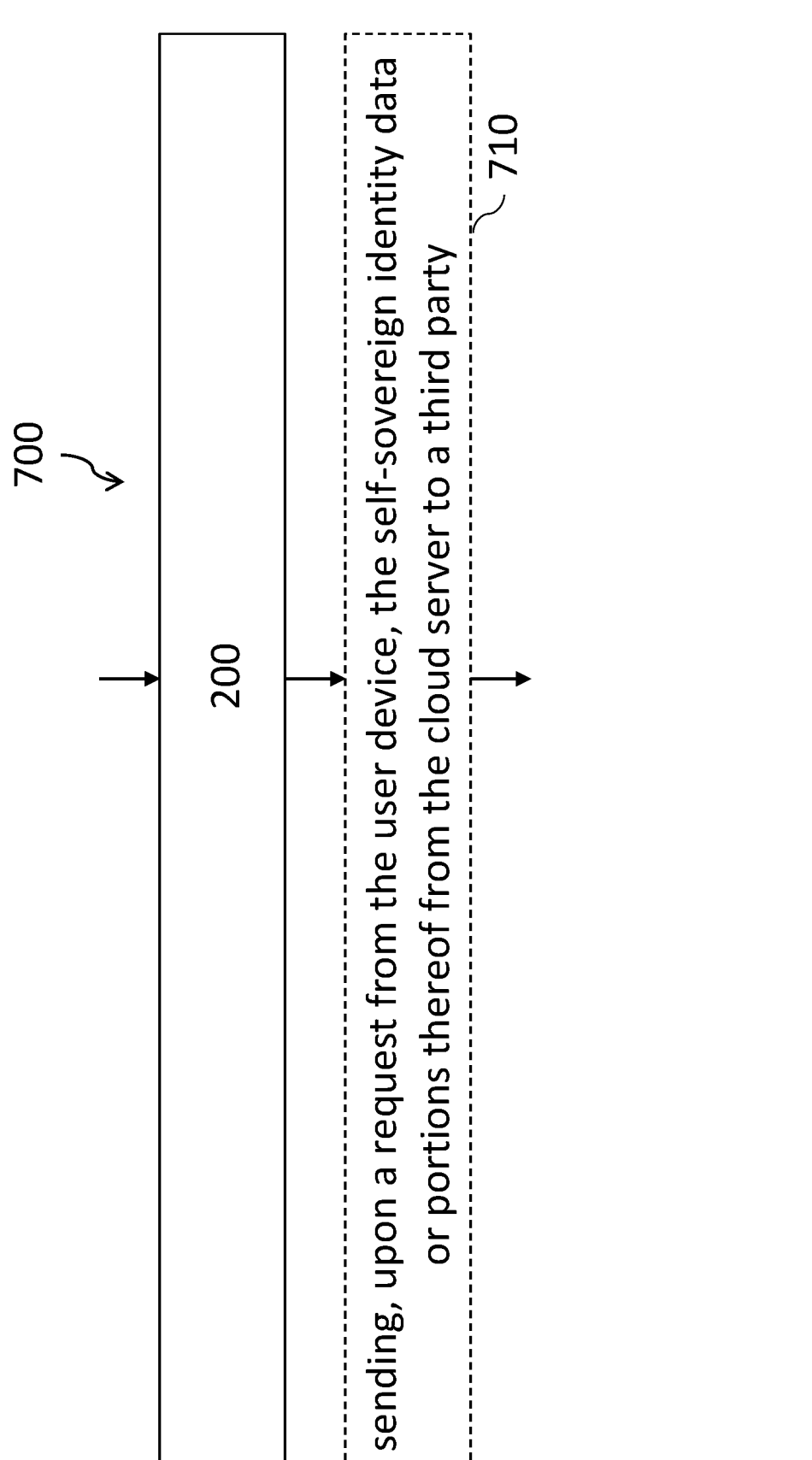
FIG. 7 illustrates a flow chart of another example of the method for providing the self-sovereign identity cloud service to the user.

FIG. 7 illustrates a flow chart of a method 700 which may comprise optional steps enhancing method 200. The method 700 comprises the steps of method 200. The method 700 optionally comprises sending 710, upon a request from the user device (such as user device 340), the self-sovereign identity data (such as the self-sovereign identity data 330) or portions thereof from the cloud server (such as cloud server 300) to a third party. The third party may be any entity which may benefit from the self-sovereign identity data of the user. The third party may, e.g., represent a private individual, a company, or an institution requesting a proof of an age of the user.

Figure 8:
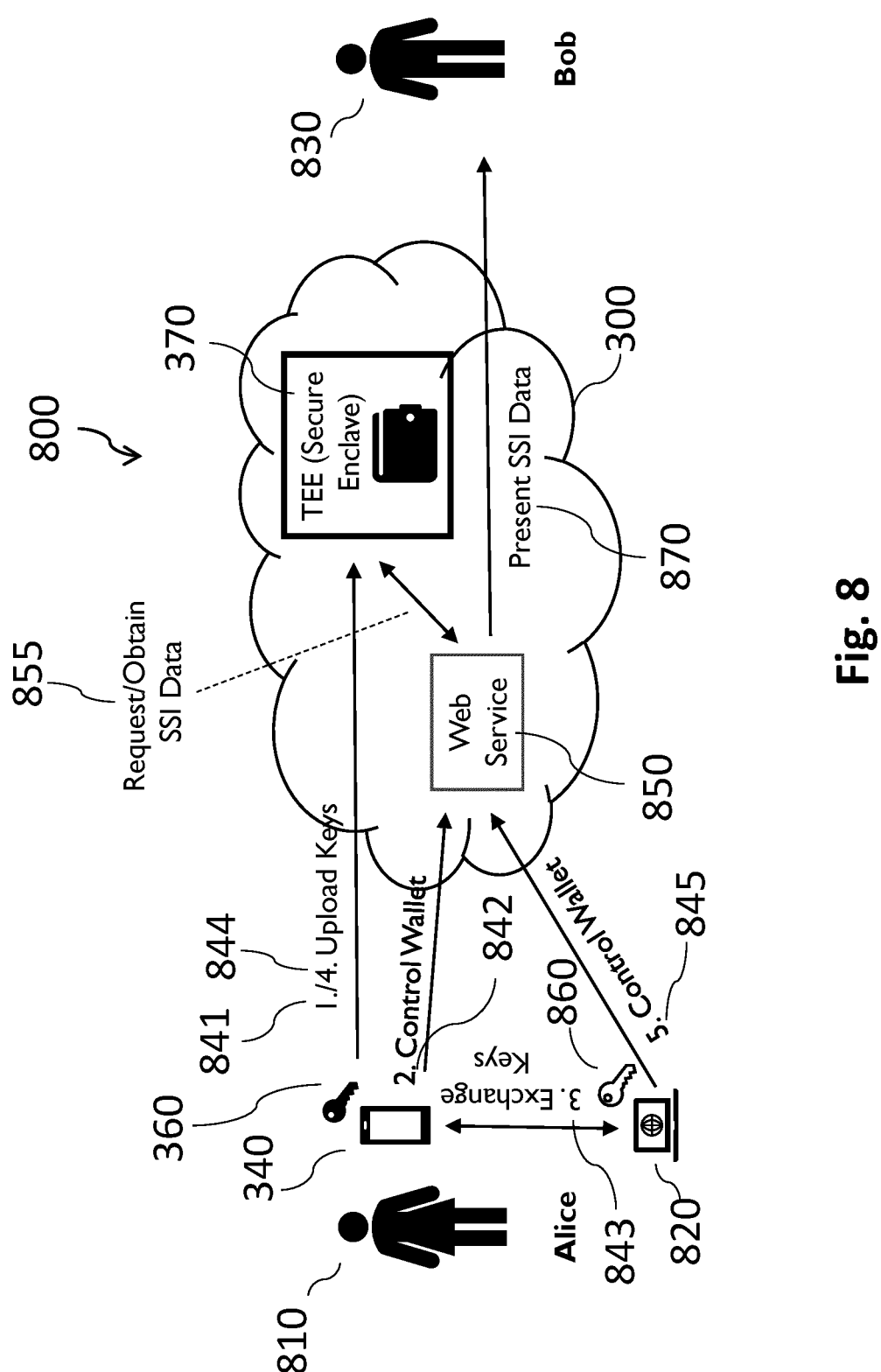
FIG. 8 illustrates a scheme of an exemplary registration process of the user device/a second user device and of an exemplary interaction with a third party.

The method 700 will be explained in the following with reference to FIG. 8 which illustrates a schematic representation of a registration (410/610) of user device 340 and a second user device 820 of a user 810 (designated as "Alice") as well as an interaction (710) with a third party 830 (designated as "Bob").

As a first step 841, the user 810 uploads the user public key 360 on the TEE 370 of the cloud server 300. The first step 841 may relate to the above-mentioned registering 410 of the user device 340, here: a smartphone. A digital wallet of the user 810 may be created on the TEE 370 as a part of the registration.

As a second step 842, the user 810 uses a web service 850 of the cloud server 300 to control her digital wallet on the TEE 370. For instance, the user 810 may request, upload self-sovereign identity data, such as self-sovereign identity data 330, register further user devices, or instruct the web service to show the self-sovereign identity data or portions thereof to the third party 830.

The web service 850 may handle any interaction 855 between the user device 340 and the TEE 370, e.g., a synchronization of self-sovereign identity data stored on the user device 340 and data stored on the TEE 370. The web service 850 may, e.g., provide a Web-based interface to the cloud server 300 which may be utilized by the user 810 via a mobile app on the user device 340. The web service 850 may use a Web protocol such as HTTP (Hypertext Transfer Protocol) for transferring machine-readable file formats such as JSON (Java-Script Object Notation).

As a third step 843, the user device 340 and the second user device 820, here: a laptop, exchange keys. For instance, the second user device 820 may generate, upon a request of the user 810, a second user asymmetric key pair and send (via a computer network) a corresponding second user public key 860 to the user device 340. The user device 340, as a fourth step 844, uploads the second user public key 860 on the TEE 370. The third step 843 and the fourth step 844 may relate to the above-mentioned registering 610 of a second user device. As a fifth step 845, the user 810 controls her digital wallet on the TEE 370 via the second user device 820.

The user device 340 may be thought of a "master device" as it may have been used to initialize the digital wallet. After the second user device 820 is registered, it may have the same function to control and access the digital wallet as user device 340.

The user 810 may want to present the self-sovereign identity data or portions thereof to the third party 830. The web service 850 may then request the self-sovereign identity data or the indicated portion from the TEE 370 and send (870) it to the third party 830. For instance, the user 810 may want to prove her legal age to a shop employee, in this case the third party 830. The user 810 may receive on her user device 340 a communication endpoint of an electronic device of the shop employee 830, such as an email address or a network address. The user 810 may send the user public key 360 to the electronic device of the shop employee 830. The user 810 may then forward the communication endpoint to the web service 850 and instruct via a user interface on the user device 340 the web service 850 to present her legal age to the third party 830. The web service 850 may request a data packet comprising the legal age from the TEE 370. The TEE 370 may retrieve the legal age from the self-sovereign identity data, encrypt it and then provide the requested data packet to the web service 850. The web service 850 may then send the data packet to the communication endpoint of the shop employee 830. The shop employee 830 may decrypt the data packet based on the user public key 360. Additionally, the legal age may be confirmed by a trusted entity, such as a governmental institution. For this purpose, the data packet may comprise a digital signature of the trusted entity. The shop employee 830 may check the digital signature based on a public key of the trusted entity, e.g., stored on a blockchain. This interaction with the third party 830 may be considered an example. The present disclosure may include any other interactions between the web service 850 and the third party 830 for communicating self-sovereign identity data or portions thereof to the third party 830. The third party 830 may represent any other entity, such as an organization, a private individual, or alike.

The digital wallet managed by the TEE 370 may manage digital interactions with the third party 830 on behalf of the user 810. Self-sovereign identity data 330 stored in the digital wallet may be protected against modifications and inspections unintended by the user 810. In the case the user device 340 is lost, broken, or stolen, the digital wallet and its protection remains intact.

Figure 10:
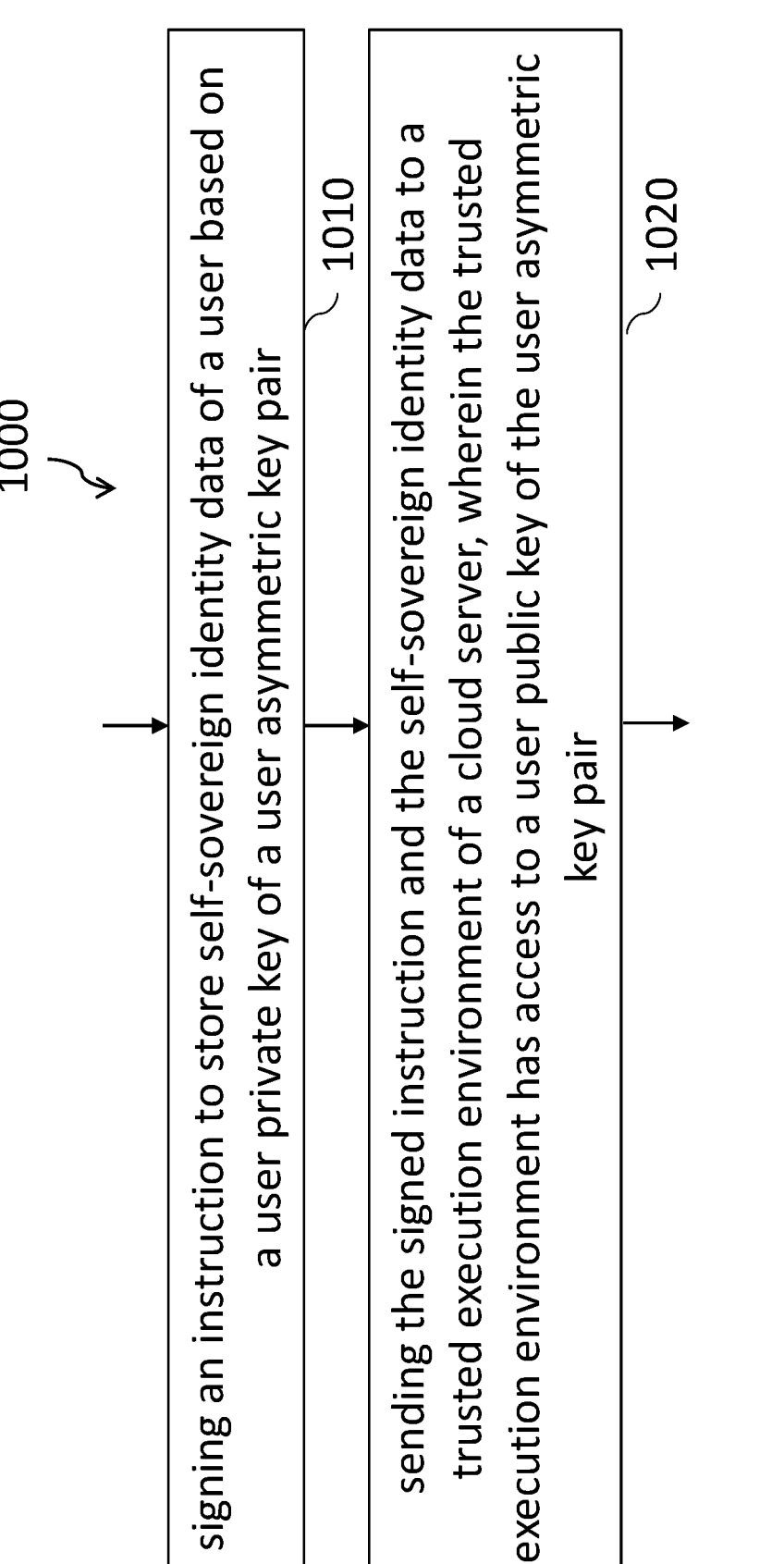
FIG. 10 illustrates a flow chart of an example of a self-sovereign identity method for providing the self-sovereign identity cloud service to the user.

FIG. 9 and FIG. 10 illustrate a flow chart of a cloud service method 900 and a self-sovereign identity method 1000, respectively. The cloud service method 900 may refer to parts of the method 200 that are associated with the cloud server 300. The self-sovereign identity method 100 may refer to parts of the method 200 that are associated with the user device 340.

Referring to FIG. 9, the cloud service method 900 comprises receiving 910 a signed instruction (320) to store self-sovereign identity data (330) of a user (810) and the self-sovereign identity data (330) from a user device (340), wherein the instruction (320) is signed based on a user private key (350) of a user asymmetric key pair, wherein the user private key (350) is stored on the user device (340). The cloud service method 900 further comprises verifying 920, in a TEE (370), the signed instruction (320) based on a user public key (360) of the user asymmetric key pair. The cloud service method 900 further comprises, if the signed instruction (320) is approved, storing 930 the self-sovereign identity data (330) in the TEE (370).

Referring to FIG. 10, the self-sovereign identity method 1000 comprises signing 1010 an instruction (320) to store self-sovereign identity data (330) of a user (810) based on a user private key (350) of a user asymmetric key pair. The self-sovereign identity method 1000 further comprises sending 1020 the signed instruction (320) and the self-sovereign identity data (330) to a TEE (370) of a cloud server (330), wherein the TEE (370) has access to a user public key (360) of the user asymmetric key pair.

The cloud service method 900 and the self-sovereign identity method 1000 may allow a user of a digital wallet to outsource the digital wallet from a user device to a TEE of a cloud server. This may be advantageous in terms of availability, reliability, and security of the digital wallet. Moreover, the digital wallet may be synchronized easily and, in case the user device is stolen or broken, may still be valid.

More details and aspects of the cloud service method 900 and the self-sovereign identity method 1000 are explained in connection with the proposed technique or one or more examples described above. The cloud service method 900 and the self-sovereign identity method 1000 may comprise one or more additional optional features corresponding to one or more aspects of the proposed technique, or one or more examples described above.

Note that the present technology can also be configured as described below:

(1) Method for providing a self-sovereign identity cloud service to a user, comprising:
  signing, on a user device of the user, an instruction to store self-sovereign identity data of the user based on a user private key of a user asymmetric key pair;
  sending the signed instruction and the self-sovereign identity data from the user device to a cloud server;

verifying, in a trusted execution environment of the cloud server, the signed instruction based on a user public key of the user asymmetric key pair; and
  if the signed instruction is approved, storing the self-sovereign identity data in the trusted execution environment.

(2) The method of (1), further comprising:
  registering the user device on the trusted execution environment, wherein registering comprises:
  receiving, on the user device, a cloud public key of a cloud asymmetric key pair from the cloud server;
  generating the user asymmetric key pair on the user device;
  encrypting, on the user device, the user public key of the user asymmetric key pair based on the cloud public key;
  sending the encrypted user public key from the user device to the cloud server;
  decrypting, in the trusted execution environment, the encrypted user public key based on a cloud private key of the cloud asymmetric key pair;
  associating the user device with the self-sovereign identity cloud service by storing the user public key in the trusted execution environment; and
  storing the user private key of the user asymmetric key pair on the user device.

(3) The method of (2), wherein receiving, on the user device, the cloud public key of the cloud asymmetric key pair comprises:
  receiving, at the user device, a remote attestation for the cloud public key from an attestation server.

(4) The method of (2) or (3), wherein sending the signed instruction and the self-sovereign identity data from the user device to the cloud server comprises:
  encrypting, on the user device, the self-sovereign identity data based on the cloud public key.

(5) The method of any of (2) to (4), further comprising:
  registering a second user device of the user on the trusted execution environment, wherein registering comprises:
  receiving, on the user device, a second user public key of a second user asymmetric key pair from the second user device, wherein a second user private key of the second user asymmetric key pair is stored on the second user device;
  encrypting, on the user device, the second user public key based on the cloud public key;
  sending the encrypted second user public key from the user device to the cloud server;
  decrypting, in the trusted execution environment, the encrypted second public key based on the cloud private key; and
  associating the second user device with the self-sovereign identity cloud service by storing the second user public key on the trusted execution environment.

(6) The method of (5), further comprising:
  synchronizing, on the second user device, self-sovereign identity data stored on the second user device with the self-sovereign identity data stored on the trusted execution environment.

(7) The method of (5) or (6), further comprising:
  blocking the user device/the second user device on the trusted execution environment, wherein blocking comprises:
  receiving, at the second user device/the user device, a tag of the user public key/second user public key from the trusted execution environment;

sending a blocking request indicating the tag of the user public key/the second user public key from the second user device/the user device to the cloud server; and deleting the user public key/the second user public key in the trusted execution environment.

(8) The method of any of (1) to (7), further comprising: synchronizing, on the user device, self-sovereign identity data stored on the user device with the self-sovereign identity data stored on the trusted execution environment.

(9) The method of any of (1) to (8), further comprising: sending, upon a request from the user device, the self-sovereign identity data or portions thereof from the cloud server to a third party.

(10) A cloud server for providing a self-sovereign identity cloud service to a user, comprising:

an interface configured to receive a signed instruction to store self-sovereign identity data of the user and the self-sovereign identity data from a user device, wherein the instruction is signed based on a user private key of a user asymmetric key pair, wherein the user private key is stored on the user device; and a trusted execution environment configured to:

verify the signed instruction based on a user public key of the user asymmetric key pair; and if the signed instruction is approved, store the self-sovereign identity data.

(11) A cloud service method for providing a self-sovereign identity cloud service to a user, comprising:

receiving a signed instruction to store self-sovereign identity data of the user and the self-sovereign identity data from the user device, wherein the instruction is signed based on a user private key of a user asymmetric key pair, wherein the user private key is stored on the user device;

verifying, in a trusted execution environment, the signed instruction based on a user public key of the user asymmetric key pair; and if the signed instruction is approved, storing the self-sovereign identity data in the trusted execution environment.

(12) A self-sovereign identity method, comprising:

signing an instruction to store self-sovereign identity data of a user based on a user private key of a user asymmetric key pair; and sending the signed instruction and the self-sovereign identity data to a trusted execution environment of a cloud server, wherein the trusted execution environment has access to a user public key of the user asymmetric key pair.

(13) A program having a program code for performing the method of (11), when the program is executed on a processor or a programmable hardware.

(14) A program having a program code for performing the method of (12), when the program is executed on a processor or a programmable hardware.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors, or other programmable hardware components. Examples may also cover program storage devices, such as digital data storage media, which are machine-, processor- or computer-readable and encode and/or contain machine-executable, processor-executable, or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. A method for providing a self-sovereign identity cloud service to a user, comprising:

signing, on a user device of the user, an instruction to store self-sovereign identity data of the user based on a user private key of a user asymmetric key pair, wherein the self-sovereign identity data comprises user-controlled identity credentials verifiable by third parties that enable the user to control the user's self-sovereign identity without intervention of a centralized identity management system;

sending the signed instruction and the self-sovereign identity data from the user device to a cloud server;

verifying, in a trusted execution environment of the cloud server, the signed instruction based on a user public key of the user asymmetric key pair; and in a case that the signed instruction is approved, storing the self-sovereign identity data in the trusted execution environment.

2. The method of claim 1, further comprising:

registering the user device on the trusted execution environment, wherein registering comprises:

receiving, on the user device, a cloud public key of a cloud asymmetric key pair from the cloud server;

generating the user asymmetric key pair on the user device;

encrypting, on the user device, the user public key of the user asymmetric key pair based on the cloud public key;

sending the encrypted user public key from the user device to the cloud server;

decrypting, in the trusted execution environment, the encrypted user public key based on a cloud private key of the cloud asymmetric key pair;

associating the user device with the self-sovereign identity cloud service by storing the user public key in the trusted execution environment; and storing the user private key of the user asymmetric key pair on the user device.

3. The method of claim 2, wherein receiving, on the user device, the cloud public key of the cloud asymmetric key pair comprises:

receiving, at the user device, a remote attestation for the cloud public key from an attestation server.

4. The method of claim 2, wherein sending the signed instruction and the self-sovereign identity data from the user device to the cloud server comprises:

encrypting, on the user device, the self-sovereign identity data based on the cloud public key.

5. The method of claim 2, further comprising:

registering a second user device of the user on the trusted execution environment, wherein registering comprises:

receiving, on the user device, a second user public key of a second user asymmetric key pair from the second user device, wherein a second user private key of the second user asymmetric key pair is stored on the second user device;

encrypting, on the user device, the second user public key based on the cloud public key;

sending the encrypted second user public key from the user device to the cloud server;

decrypting, in the trusted execution environment, the encrypted second public key based on the cloud private key; and associating the second user device with the self-sovereign identity cloud service by storing the second user public key on the trusted execution environment.

6. The method of claim 5, further comprising:

synchronizing, on the second user device, self-sovereign identity data stored on the second user device with the self-sovereign identity data stored on the trusted execution environment.

7. The method of claim 6, further comprising:

blocking the user device/the second user device on the trusted execution environment, wherein blocking comprises:

receiving, at the second user device/the user device, a tag of the user public key/second user public key from the trusted execution environment;

sending a blocking request indicating the tag of the user public key/the second user public key from the second user device/the user device to the cloud server; and deleting the user public key/the second user public key in the trusted execution environment.

8. The method of claim 1, further comprising:

synchronizing, on the user device, self-sovereign identity data stored on the user device with the self-sovereign identity data stored on the trusted execution environment.

9. The method of claim 1, further comprising:

sending, upon a request from the user device, the self-sovereign identity data or portions thereof from the cloud server to a third party.

10. The method of claim 1, wherein the self-sovereign identity data is managed by the trusted execution environment as part of a digital wallet for the user's self-sovereign identity.

11. A cloud server for providing a self-sovereign identity cloud service to a user, comprising:

an interface configured to receive a signed instruction to store self-sovereign identity data of the user and the self-sovereign identity data from a user device, wherein the instruction is signed based on a user private key of a user asymmetric key pair, wherein the user private key is stored on the user device, wherein the self-sovereign identity data comprises user-controlled identity credentials verifiable by third parties that enable the user to control the user's self-sovereign identity without intervention of a centralized identity management system; and a trusted execution environment configured to:

verify the signed instruction based on a user public key of the user asymmetric key pair; and in a case that the signed instruction is approved, store the self-sovereign identity data.

12. A cloud service method for providing a self-sovereign identity cloud service to a user, comprising:

receiving a signed instruction to store self-sovereign identity data of the user and the self-sovereign identity data from the user device, wherein the instruction is signed based on a user private key of a user asymmetric key pair, wherein the user private key is stored on the user device, wherein the self-sovereign identity data comprises user-controlled identity credentials verifiable by third parties that enable the user to control the user's self-sovereign identity without intervention of a centralized identity management system;

verifying, in a trusted execution environment, the signed instruction based on a user public key of the user asymmetric key pair; and if the signed instruction is approved, storing the self-sovereign identity data in the trusted execution environment.

13. A program having a program code for performing the method of claim 12, when the program is executed on a processor or a programmable hardware.

14. A self-sovereign identity method, comprising:

signing an instruction to store self-sovereign identity data of a user based on a user private key of a user asymmetric key pair, wherein the self-sovereign identity data comprises user-controlled identity credentials verifiable by third parties that enable the user to control the user's self-sovereign identity without intervention of a centralized identity management system; and sending the signed instruction and the self-sovereign identity data to a trusted execution environment of a cloud server, wherein the trusted execution environment has access to a user public key of the user asymmetric key pair.

15. A program having a program code for performing the method of claim 14, when the program is executed on a processor or a programmable hardware.

\* \* \* \* \*